G. C. SANDMYRE.
PULLEY BLOCK.
APPLICATION FILED MAR. 31, 1910.
980,010.
Patented Dec. 27, 1910.
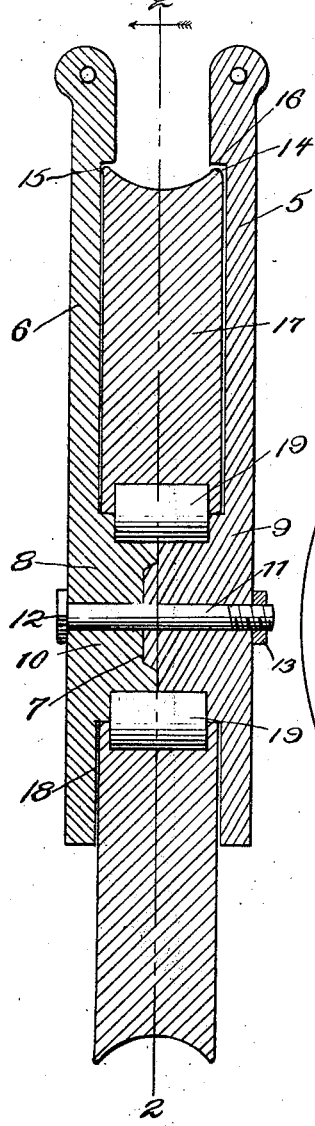
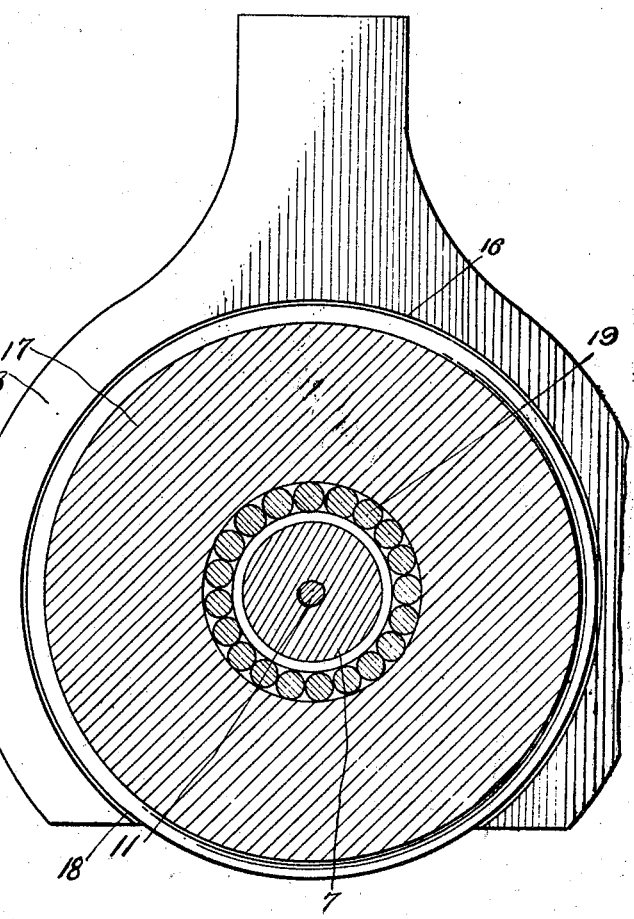
Inventor
Guy C. Sandmyre
By Victor J. Evans
Attorney
Witnesses
Wm. S. McDowell.
John A. Dingay,

UNITED STATES PATENT OFFICE.

GUY C. SANDMYRE, OF BUCODA, WASHINGTON.

PULLEY-BLOCK.

980,010.  Specification of Letters Patent.  Patented Dec. 27, 1910.

Application filed March 31, 1910. Serial No. 552,546.

*To all whom it may concern:*

Be it known that I, GUY C. SANDMYRE, a citizen of the United States, residing at Bucoda, in the county of Thurston and State of Washington, have invented new and useful Improvements in Pulley-Blocks, of which the following is a specification.

This invention relates to improvements in pulley blocks and has for its object the provision of a device of that kind, the frame of which includes a pair of side members connected together by a hub of relatively large diameter and a sheave rotatably mounted on said hub.

Another object is the provision of a frame the side members of which are provided on their opposed inner surfaces with countersunk portions the outer sides of which constitute shoulders which overhang the edge of the sheave, whereby the danger of the line fouling with the side members will be positively prevented.

A further object is the provision of a hub peripherally provided with a groove and a sheave provided on its inner surface with a groove coöperating with the groove of the hub to provide a race, and a plurality of ball or roller bearings arranged in said race.

With these and other objects in view, which will more fully hereinafter appear, the present invention consists in certain novel details of construction and arrangement of parts, hereinafter fully described, illustrated in the accompanying drawings and more particularly pointed out in the appended claim; it being understood that various changes in the form, proportion, size, and minor details of the device may be made within the scope of the appended claim, without departing from the spirit or sacrificing any of the advantages of the invention.

In the accompanying drawings, forming a part of the specification:—Figure 1 is a sectional end elevation of the device. Fig. 2 is a sectional front elevation on the line 2—2 of Fig. 1.

Similar numerals of reference are employed to designate corresponding parts throughout.

The frame of the block includes a pair of side members designated in general by the numerals 5 and 6. As shown in Fig. 2 the body portions of these members are substantially semi-circular in contour and somewhat greater in diameter than the diameter of the sheave to be employed. By reference to Fig. 1 it will be seen that formed on the inner surface of the member 6 and at substantially the central portion thereof is a cylindrical shoulder 7, the said shoulder having a central opening the inner end of which is counterbored as shown at 8.

Formed at the central portion and on the inner face of the opposite side member 5 is a cylindrical shoulder 9 corresponding in diameter to the diameter of the shoulder 7, the said shoulder 9 being centrally provided with a circular boss 10 of a diameter to nicely fit within the counterbore 8 of the shoulder 7. The shoulder 9 is centrally provided with an opening to aline with the central opening of the shoulder 7, these alining openings receiving a pin or bolt 11, one end of which is provided with a head 12 and the opposite end screw-threaded to receive a nut 13 serving to secure the pin against displacement in the members and further serving to clamp the members together, as shown in Fig. 1.

By reference now to Fig. 1 it will be seen that the opposed inner surfaces of the members 5 and 6 are provided with semi-circular countersinks 14 and 15, the outer sides of these countersinks constituting shoulders 16.

The sheave is designated by the numeral 17 and in thickness corresponds to the distance between the surfaces of the countersinks 14 and 15 and in diameter is somewhat less than the widest portion of the said countersinks. The sheave is centrally provided with an opening to receive the hub formed by the circular shoulders 7 and 9 and when arranged on the hub the shoulders 16 will overlie the edge of the sheave, whereby the danger of the line fouling with the side members 5 and 6 will be positively prevented. Peripheral grooves 18 are formed on the hub sections 7 and 9 and formed in the inner periphery of the hub is a groove corresponding in width to the combined widths of the grooves 18 and arranged concentric with the said grooves, the groove of the sheave and the said grooves 18 coöperating to present a race for the reception of ball or bearing rollers 19. With this construction it will be manifest that the sheave will rotate on the bearing rollers 19, whereby the friction between the sheave and its journal will be greatly reduced.

From the foregoing, it is evident that I have provided a device which is comparatively simple in structure and inexpensive in manufacture; embodying few parts and these so arranged that the danger of derangement will be reduced to a minimum.

I claim:—

In a pulley block, a frame including a pair of side members countersunk on their inner faces, a hub section formed in the countersunk portion of one of said side members and projecting beyond the inner surface of said side member, the said hub section having a central bore the inner end of which is counterbored, a hub section formed in the countersunk portion of the opposite side member and projecting beyond the inner surface of said member and terminating in a reduced boss receivable by the counterbore of the first-named hub section, said second hub section being provided with a bore to aline with the bore of the first-named hub section, said hub sections being peripherally provided with circular rabbets which coöperate to form a circular groove when the said hub sections bear one upon the other, a sheave arranged in the countersunk portions of said side members and having a central opening to receive said hub sections, the medial portion of the wall of said opening being provided with a circular groove alining with the groove formed by said rabbets, and a plurality of bearing rollers arranged in said grooves.

In testimony whereof I affix my signature in presence of two witnesses.

GUY C. SANDMYRE.

Witnesses:
 JOE KRUPP,
 J. L. SWIFT.